United States Patent Office 2,987,259
Patented June 6, 1961

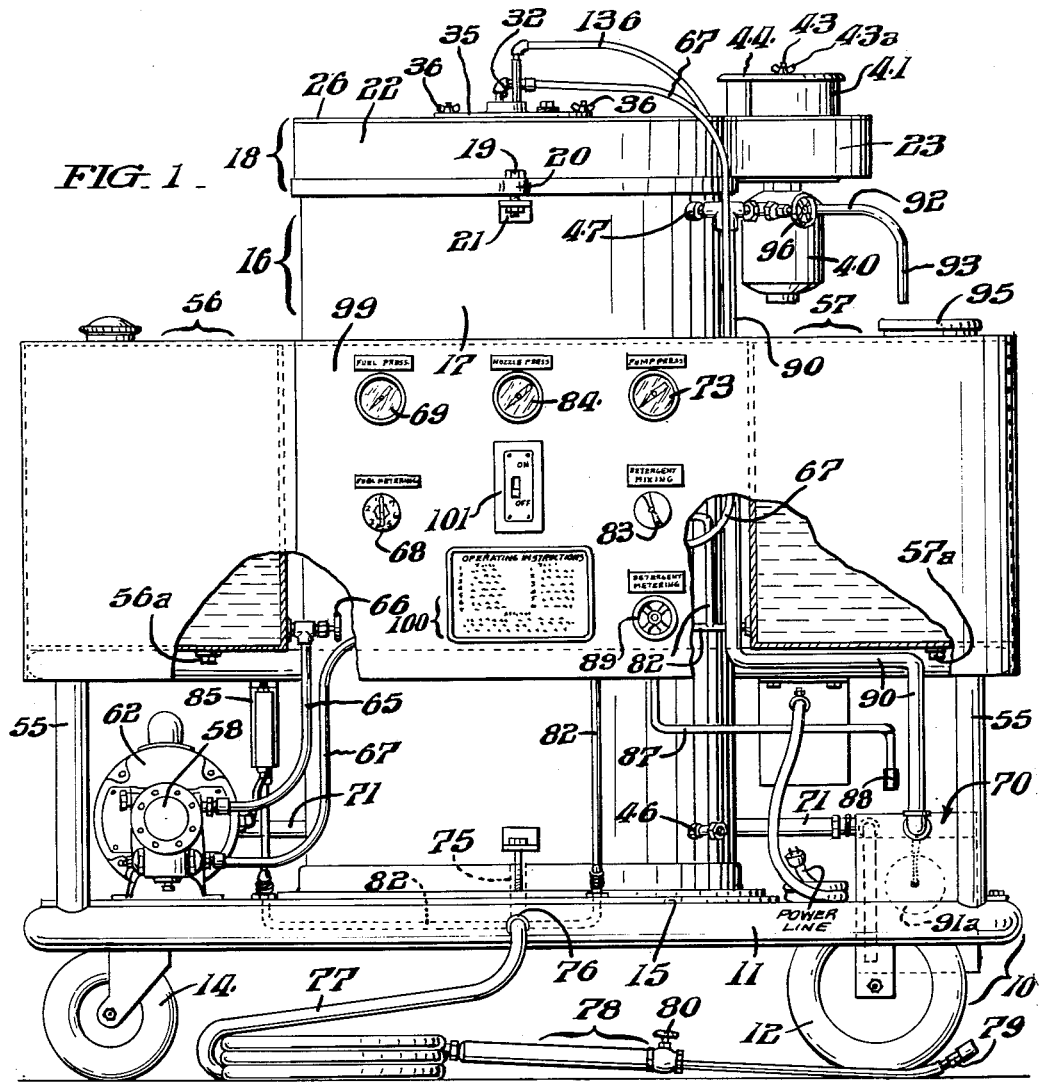

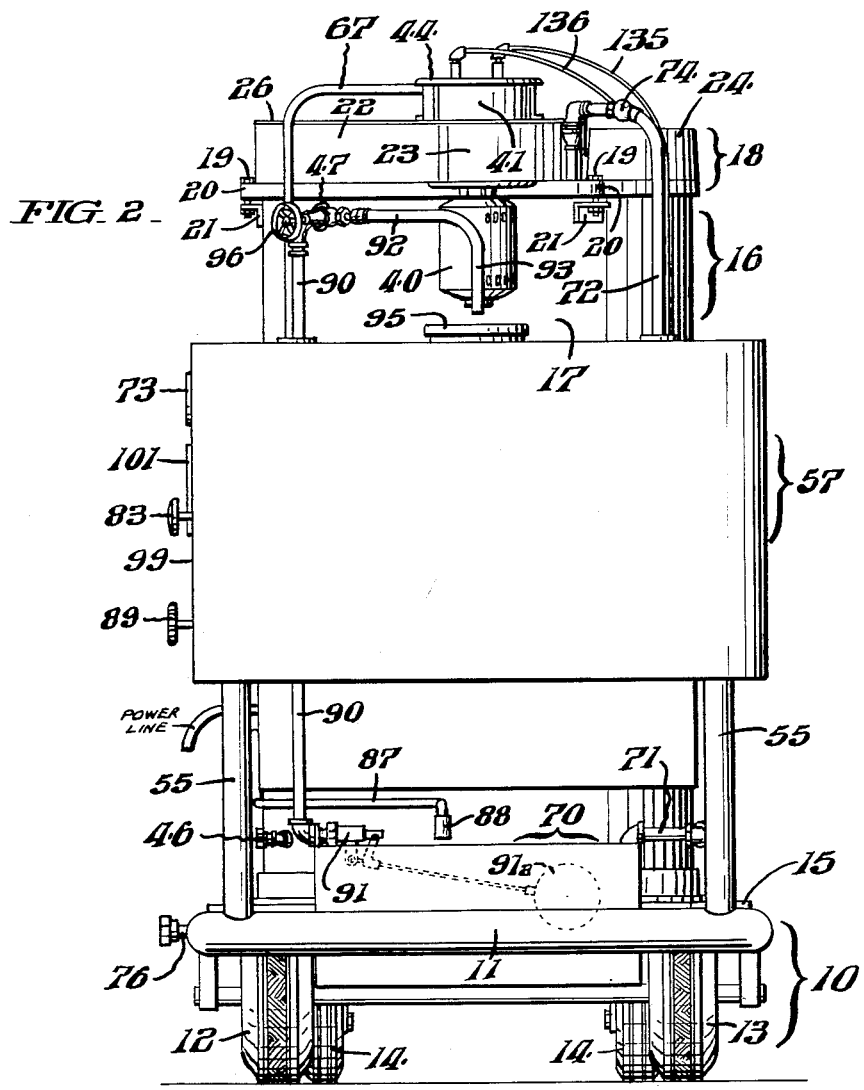

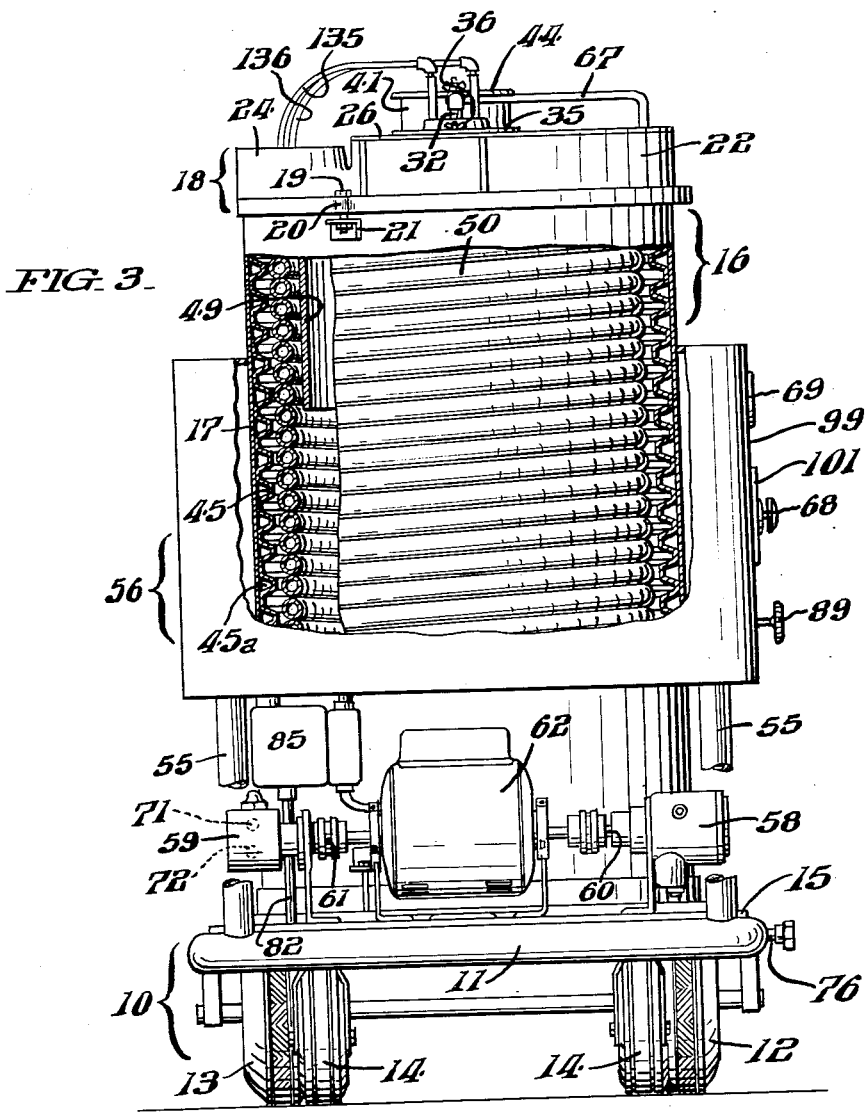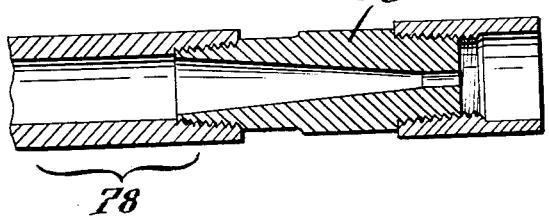

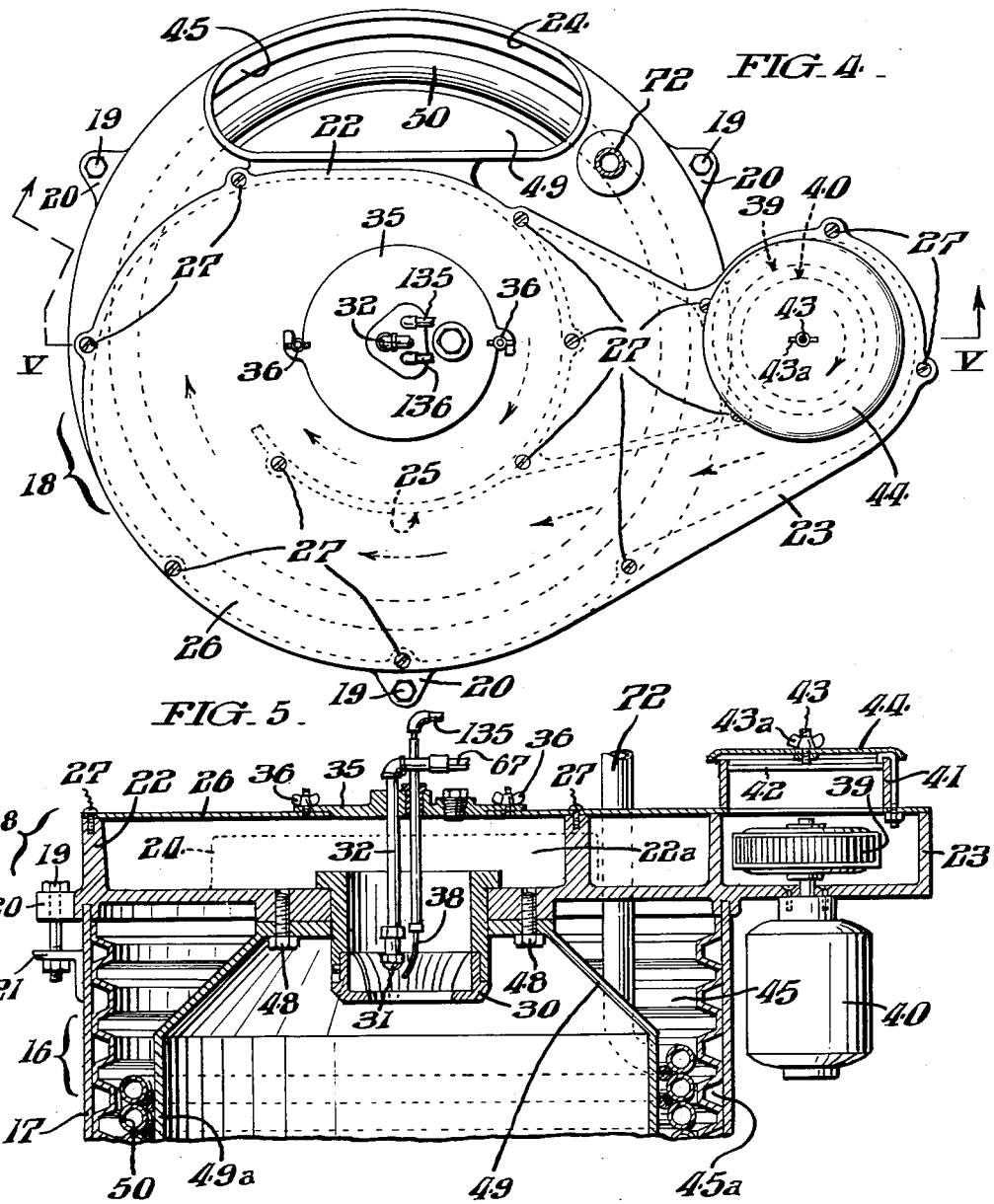

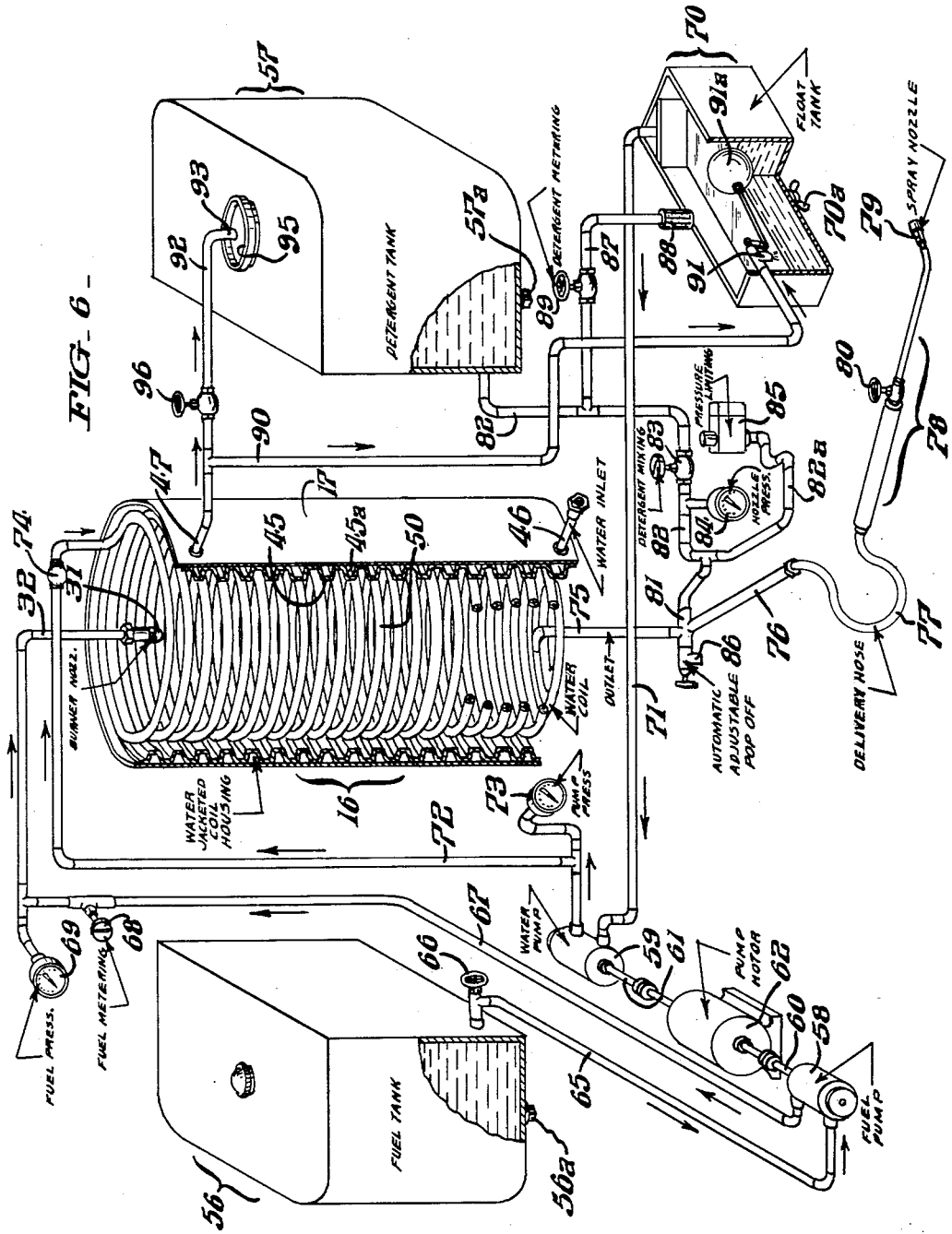

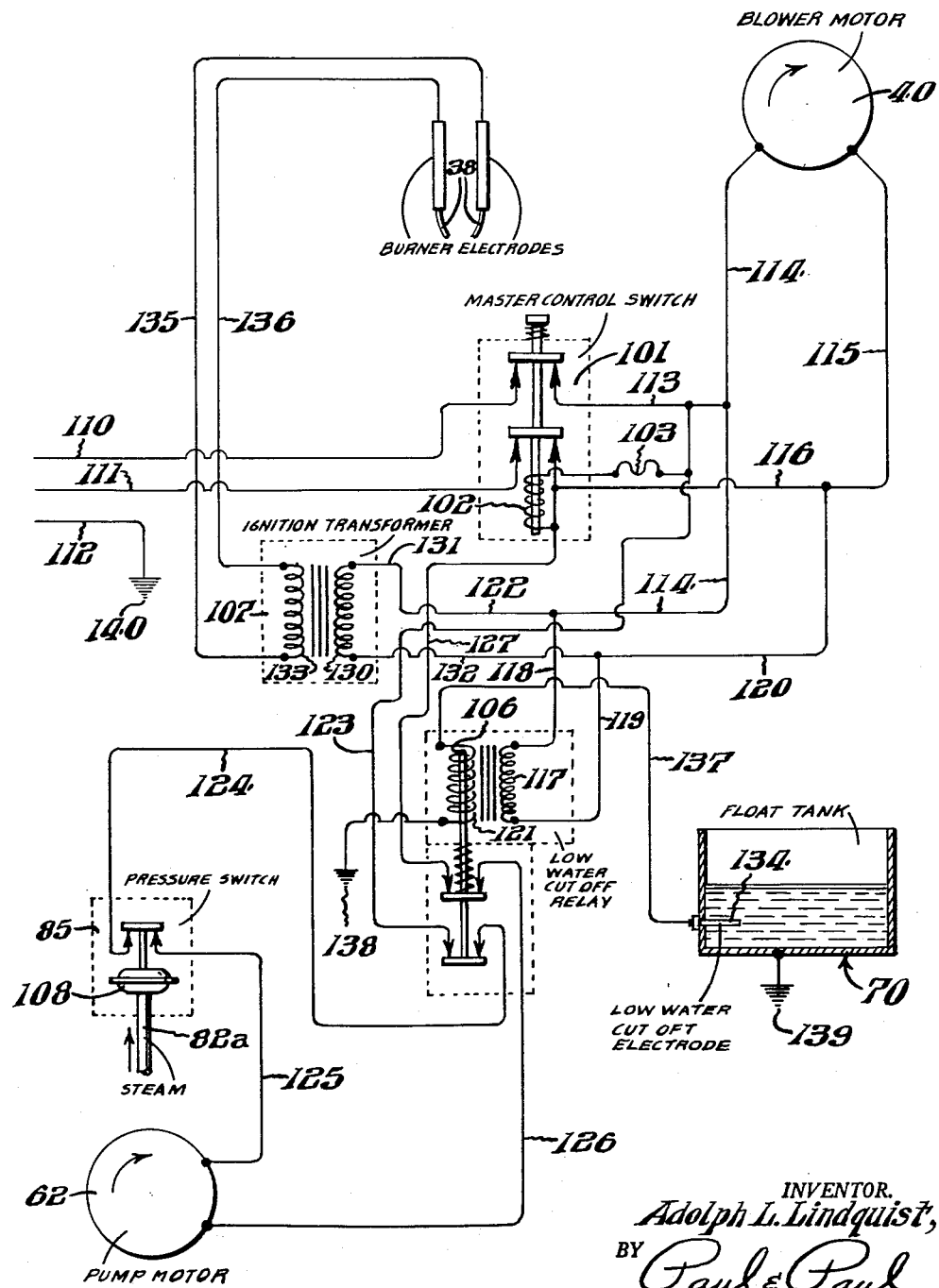

2,987,259
WATER HEATING AND SPRAY APPARATUS
Adolph L. Lindquist, Oreland, Pa., assignor to Turbo Machine Company, Lansdale, Pa., a corporation of Pennsylvania
Filed June 4, 1959, Ser. No. 818,141
8 Claims. (Cl. 239—130)

This invention relates to water heating apparatus.

The chief aim of my invention is to provide an automatically oil fired water heating apparatus which is capable of furnishing hot water alone, or hot water containing soap, detergent or a chemical agent, substantially instantaneously for use in cleaning or other purposes; which is simple in construction and reliable in operation; and which is highly efficient from the standpoint of fuel consumption.

Briefly described, the apparatus comprises a heating unit in which the water is heated; separate supply reservoirs, respectively, for the liquid fuel and for the soap, detergent or chemical which is to be added to the water; a pump for delivering the fuel to a burner within the heating unit; a pump for delivering the water to the heating unit; an electric motor for driving the pumps; and electrical facilities for enabling the apparatus to function automatically.

Other objects and attendant advantages will appear from the following detailed description of the attached drawings, wherein:

FIG. 1 is a view in side elevation of a water heating apparatus conveniently embodying my invention in one form with portions broken out to expose important structural details.

FIG. 2 shows the apparatus in end elevation as seen when looking from the right of FIG. 1.

FIG. 3 is an end elevation of the apparatus as seen when looking from the left of FIG. 1 with a portion broken out and the water heating unit partially shown in section.

FIG. 4 shows the heating unit in top plan, drawn to a larger scale.

FIG. 5 is a fragmentary sectional view of the upper part of the heating unit, the section being taken as indicated by the angled arrows V—V in FIG. 4.

FIG. 6 is a diagrammatic view in perspective showing the supply reservoirs for the burner fuel and the detergent or other solution, respectively, and the piping system through which fuel is fed to the burner of the heating unit, the water to the coils of the heating unit, and the detergent solution to the water before discharge from the apparatus.

FIG. 7 is a fragmentary view in section of the nozzle of a spray gun embodied in the apparatus.

FIG. 8 shows an instruction plate with which the apparatus is provided; and

FIG. 9 is a wiring diagram of various electrical instrumentalities used in powering and controlling the operation of the apparatus.

In the form herein exemplified, the several components of the apparatus are mounted on a carriage 10 whereof the rectangular chassis frame 11 is constructed of tubing and is provided at one end with a pair of rubber tired wheels 12, 13, and on the opposite end with a pair of rubber tired swivel wheels or casters 14 for easy maneuvering of the apparatus from place to place. Supported crosswise of the side longitudinals of the chassis frame 11, medially of the length of the latter, is a foundation plate 15 whereon is rigidly mounted the heating unit 16 which has an upright cylindrical casing wall 17 fashioned from suitably stiff plate metal to form a tank-like component.

As best seen in FIGS. 4 and 5, the heating unit 16 is closed at the top by a combustion head 18 which is secured by clamp bolts 19 to the cylindrical wall 17. The shanks of bolts 19 pass through circumferentially spaced lugs 20 on said head and engage into lugs 21 propecting from the wall 17 of the tank at correspondingly spaced intervals. As further shown, the head 18 has a hollow raised portion 22 having a round-ended tangential prolongation 23, said prolongation extending beyond the confines of the wall 17 of the heating unit 16. It is to be noted that the internal construction of the head 18 is such as to define a spiral passage or channel 25 leading from the rounded end of the prolongation 23 to the midportion of the hollow 22a in the head. The hollow 22a of head 18 is closed at the top by a cap plate 26 which is held in place by screws 27 and which has a flue opening 24.

Set into a central opening in the bottom of the head 18 is the cone 30 of an oil burner whereof the jet nozzle 31 is attached to the bottom end of a pipe 32 extending down through a central opening in the plate 26, said pipe being fixed in a cover 35 secured by wing nuts 36 engaged upon screw studs upstanding from said plate. Also, extending down through and fixed in the cover 35 into proximity to the nozzle 31 are ignition electrodes 38.

Rotatively mounted within the prolongation 23 of the combustion head 18 is a vertical axis blower fan 39 of which the electric driving motor 40 is screwed fast to said prolongation at the bottom. Surrounding an access opening in the plate 26 above the blower fan 39 is an upstanding flange ring 41 which is spanned by a spider 42 having an upstanding threaded axial stud 43a. A cover disk 44 is threadedly engaged upon the stud 43a for vertical adjustment of an annular interval between said disk 44 and the top of the flange ring 41 through which the air used for combustion is drawn to pass through channel 25 to the fuel spray from the nozzle 31. After adjustment, the disk 44 is clamped against displacement by the wing nut indicated at 43.

A lining 45 of spirally corrugated sheet metal forms a spiral flow channel 45a for water along the inner surface of the casing wall 17 of the heating unit 16. As best shown in FIG. 6, the channel 45a has an inlet 46 at the bottom for connection, by means of a hose (not illustrated), to a source of water supply under head pressure. Affixed by bolts 48 to the bottom of the head 18 is a hollow, bell-like baffle element 49 having a cylindrical apron 49a the distal end of which extends downward into the heating unit 16 to a level short of the bottom of the latter, the diameter of said apron 49a being such that a narrow annular interval is defined between it and the inner surface of the lining 45. Arranged within this interval, with clearance all around, is a pipe coil 50 whereof the convolutions are substantially in direct mutual contact.

Sustained at an elevation above the opposite ends of the chassis frame 11 by uprights 55 are reservoirs 56 and 57, the former for liquid fuel, such as oil, and the latter for liquid detergent, said reservoirs being provided with drain plugs 56a and 57a, respectively. Supported on the chassis frame 11 beneath the fuel reservoir 56 are rotary fuel and water pumps 58 and 59 of any well known type having safety by-passes. The shafts 60 and 61 of the pumps 58 and 59 are connected to the opposite ends of the shaft of a centrally positioned electric drive motor 62, as best shown in FIGS. 3 and 6. Leading from the fuel reservoir 56 to the inlet of the pump 58 is a pipe 65 wherein is interposed a hand valve 66; and leading from the outlet of said pump is a pipe 67 which leads to the burner nozzle 31 and which is provided with a manual control valve 68 and a pressure gauge 69.

Supported on the chassis frame 11 beneath the detergent reservoir 57 is a tank 70 from which a suction pipe 71 extends to the inlet of the pump 59, said tank having a drain plug 70a. The outlet of the water pump 59 is connected by a pipe 72 to the top end of the coil 50 in the heating unit 16, said pipe 72 being fitted with a pressure gauge 73 and a check valve 74. To the bottom end of the coil 50 is connected an outlet pipe 75 having a lateral branch 76 which under-reaches the chassis 11 and whereto is connected a water delivery hose 77, said hose terminating in a gun 78 fitted with a venturi spray tip 79 (see FIG. 7) and a manually controllable discharge valve 80. Connecting into one end of a T fitting 81 at the juncture of the pipes 75 and 76 is a branch pipe 82 which leads from the detergent reservoir 57 and in which are interposed a manually regulatable valve 83, a pressure gauge 84 and, through a spur 82a, a pressure limiting safety switch 85. To another end of the cross portion of the T fitting 81 is connected an adjustable automatic pop-off valve 86. A branch pipe 87 also is connected to the pipe 82 and terminates over the tank 70. The distal end of pipe 82 is fitted with a strainer 88; flow through said pipe 87 is controllable by a metering valve 89.

Leading downward from the outlet 47 of the spiral flow channel 45a in the wall 17 of the heating unit 16 (FIG. 6) is a pipe 90 which terminates in a valve 91 arranged to be automatically closed by the float 91a in the tank 70 when the liquid level in said tank rises to a predetermined level. A pipe 92 extends horizontally from the point of connection of the pipe 90 with the outlet 47 and terminates in a downturned end 93 over an opening 95 in the top of the detergent reservoir 57. The hand valve 96 in the pipe 92 normally is kept closed.

Extending crosswise between the reservoirs 56 and 57 at one side of the apparatus is an instrument panel 99 (FIG. 1) in which the pressure gauges 69, 73 and 84 are mounted, and where the actuating wheels of the valves 68, 83 and 89 are conveniently accessible for easy manipulation. Also mounted on the panel 99 are the instruction plate 100, which is separately illustrated in FIG. 8 and a switch 101 for controlling starting and stopping of the apparatus, said switch having an overload breaker coil 102 incorporated therewith (FIG. 9).

In addition to the various electrical instrumentalities already mentioned, I further utilize, as diagrammatically shown in FIG. 9, a cut-off relay switch 106 which opens automatically when the water in the tank 70 recedes to an abnormal low level, and an ignition transformer 107. As will be seen from FIGS. 6 and 9, the pressure limiting safety switch 85 will open upon expansion of the bellows 108 at the dead end of the spur 82a of the pipe 82. Electric current is supplied from a three wire supply line of which the conductors are designated, respectively, by the numerals 110, 111 and 112, the conductor 112 being grounded at 140. Upon closing the master switch 101, current is supplied to the blower motor 40, the flow being from the conductor 110 through the upper contact of said switch, conductors 113, 114, 115, 116 and the lower contact of said switch to the conductor 111. At the same time, the primary coil 117 of the transformer of the relay 106 is energized by current flow from the conductor 114 through the conductors 118, 119, 120, 116 to the conductor 111. By attendant energization of the secondary coil 121 of the transformer, the relay 106 is closed, whereupon current flows to the pump motor 62 from conductors 110, 113, 123, lower contact of relay 106, conductor 124, contact of safety switch 85, conductors 125, 126, upper contact of relay 106, and conductor 127 to conductor 111.

At the same time, the primary coil 130 of the transformer 107 is energized by current flow from conductors 110, 113, 114, 122, 131, 132, 120, 116 and 111. As a consequence of the energization of the primary coil 130 of the transformer 107, current at a higher voltage as induced in the secondary coil 133 of said transformer, the latter coil being connected, through leads 135 and 136, to the ignition electrodes 38 of the burner.

Set into the side of the tank 70 is a low water electrode 134 which, through a conductor 137, is connected to one end of the secondary coil 121 of the transformer of the relay 106, the other terminal of said coil being grounded as at 138. It also is to be noted that the tank 70 is grounded at 139.

In the event that the steam pressure generated in the coil 50 of the generator unit 16 becomes excessive, the switch 85 will open with attendant stopping of the motor 62 which drives the oil and water pumps 58 and 59. If the water in the tank 70 falls below the level of the electrode 134, the relay 106 will open, thereby also stopping motor 62 and, as a result, pumps 58 and 59.

*Operation*

To prepare the apparatus for use, its electrical system is connected to a suitable electric outlet, the hand valve 80 of the spray gun 78 is opened, valves 96, 83 and 89 are closed and the water inlet 46 of the spiral channel 45a of the heating unit 16 is connected, by means of a hose (not shown), to the hereinbefore mentioned supply source of water under head pressure, the water flowing upward in said channel 45a and out through the piping 47 and 90 into the float tank 70. When the water in the tank 70 reaches a definite top level, the float valve 91 automatically closes. The required amount of concentrated detergent or other agent is next introduced into the reservoir 57 through the opening 93. The valve 96 in pipe 92 next is opened and kept open until the reservoir 57 is filled with sufficient water to properly dilute the detergent, and then shut off.

With the foregoing accomplished, the master switch 101 is closed with consequent establishment of all the circuits in FIG. 9, the burner electrodes 38 being thereby energized and the blower and pump motors 41 and 62 started. By the action of the pump 59, water is drawn from the tank 70 through the pipe 71 and delivered by said pump through the pipe 72 into the top of the coil 50. After flowing down through the coil 50, the water is conducted through the piping 75, 76 and the hose 77 to the spray gun 78. As the water in the tank 70 recedes, the float actuated valve 91 opens and allows replenishing water to flow from the top of the spiral channel 45a of the heating unit 16 by way of the piping 47 and 90, into the tank 70.

As the fuel is forcibly ejected from the burner nozzle 31 by the action of the pump 58, it is mixed with air which has traversed through the spiral passage 25 in the head 18, and is ignited by the electrodes 38. In traveling through the passage 25, the air is swirled clockwise, and in passing into the baffle 49a through the burner cone 30, it is further swirled in the same direction by vanes internally of said cone. As a consequence, the air is intimately mixed with the fuel spray discharge from the nozzle 31 with assurance of perfect combustion. As will be readily understood, the baffle 49 prevents direct contact of the flame with the coil 50, and the combustion gases pass down about the bottom edge of the baffle apron 49a and upward into the annular interval between apron 49a and lining 45 occupied by said coil. The spent gases finally escape through the flue outlet 24 in the top of the head 18. It is to be noted that the flow of the combustion gases in the heating unit 16 is counter to the flow of the water in the coil 50, efficient heat exchange being thereby assured.

Upon issue of heated water from the nozzle 79 of the spray gun 78, valve 83 is opened to permit detergent to flow through branch 81 and pipe 82 from the detergent reservoir 57 to the pipe 76 and thereby thoroughly mix with the water ultimately discharged from the spray nozzle 79. After sufficient steam has been delivered to reservoir 57 to properly agitate the detergent solution, valve 83 is closed and the detergent metering valve 89 is opened to a predetermined setting. The opening of valve 89 permits a suitably metered flow of detergent solution to discharge through pipes 82, 87 into float tank 70 for mixture with the water which discharges into tank 70 from the spiral passage 45a.

With the foregoing accomplished, the apparatus is ready for use. The operator grasps the gun 78 and directs the water-detergent spray from the nozzle 79 upon the object to be cleaned. As the heated water traverses the venturi-throat of the nozzle 79, its velocity is increased by which cleaning is greatly facilitated.

As the liquid in the tank 70 recedes, the float valve 91 automatically opens with consequent flow of replenishing water up through the spiral channel 45a of the heating unit 16 for delivery, by way of the piping 47, 90 to said tank. In upwardly traversing the channel 45a, the replenishing water is preheated by the hot combustion gases rising in the unit 16 before said gases escape through the flue outlet 24 in the top of the head 18. All the while, a proportioned amount of the detergent solution is drawn from the reservoir 57 through the piping 82, 87 and mixed with the preheated water in tank 70.

Remote control for start and stop permits the operator to control the machine from the point of work in the following manner. Upon closing the valve 80 of the spray gun 78, water circulation in the apparatus ceases and, because movement of the water in the coil 50 ceases, it is subjected continuously to the heating action of the combustion gases, with resultant rise in its temperature and pressure. When the pressure of the water (or steam), as the result of such continued heating, reaches a predetermined level, the pressure limiting safety switch 85 automatically opens to shut off pump motor 62 and stop the pumps 58 and 59. When hand valve 80 again is opened, the pressure in coil 50 will drop. When such pressure drops to a certain predetermined level, the pressure limiting safety switch 85 will cose to resume the circuit to motor 62 with consequent resumption of operation of the pumps 58 and 59. Of course, upon the closing of valve 80, the detergent metering valve 89 should be closed to prevent overflow of detergent into the tank 70, and the valve 89 should be reopened when valve 80 is reopened.

In practice, the fuel and detergent reservoirs 56, 57 are designed to have a capacity sufficient for a full day's use of the apparatus. If for some unforeseen reason, the water in the tank 70 should become almost exhausted during use of the apparatus, the low water cut-off 134 will function to cause the relay 106 to open with consequent breaking of the circuit to the pump motor 62, thereby rendering the pumps 58 and 59 inoperative. The apparatus will also be rendered inoperative in the event of overheating of the pump motor 62 by automatic opening of master control switch 101 upon the flow of excessive current through the overload 103 of the coil 102. Upon the flow of excessive current through the overload 103, the circuit to coil 102 will be disrupted, thereby permitting the automatic opening of the master control switch 101.

In the event that the pressure of the water heated in the coil 50 should, for some unforeseen reason, become abnormally high, for example above 140 pounds per square inch, the switch 85 will automatically open to break the circuit to the pump motor 62 and so render the pumps 58 and 59 inoperative. In the event of failure of the pressure limiting safety switch 85 to open, the mechanical spring-loaded pop-off valve 86 will open at a predetermined internal pressure, preferably on the order of 160 pounds per square inch, to relieve the excess pressure and thereby prevent the coil 50 from bursting. Normally, the gauges 84 and 73 will indicate a pressure differential of about ten pounds. After protracted periods of use of the apparatus, this differential may rise due to mineral deposits collecting in the coil 50 until an operating differential of fifty pounds is reached. When this happens, a suitable solvent is added to the water in the tank 70 and the apparatus is operated cold until the coil 50 is cleared of the clogging mineral deposits. By removing the plugs 57a and 70a, the detergent reservoir 57 and the water tank 70 may be drained after use of the apparatus. For additional information as to the manner in which the apparatus is to be used, reference may be had to the instructions set forth on the plate 100 shown in FIG. 8.

Obviously, the apparatus can be utilized to phosphatize metallic objects, at the same time they are being cleaned of soil and grease, in preparation for painting. In such case, a combination phosphatizing and cleaning agent is introduced into the reservoir 57 instead of plain soap or detergent.

The apparatus can also be made to serve as a means for providing instantaneous hot water, with or without soap or detergent, in dwellings or laundries. In such cases, the wheeled carriage may be dispensed with, and the outlet of the coil 50 connected to a delivery pipe provided with a faucet, as will be readily apparent.

While a preferred embodiment of this invention has been described in detail, it will be obvious to one skilled in the art that various modifications may be made therein without departing from the invention as hereinafter claimed.

Having thus described my invention, I claim:

1. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through an axial opening in the bottom of the air induction head into the baffle, whereby the hot gases of combustion are constrained to pass about the bottom of said baffle and then upwardly through the aforesaid interval between and about the convolutions of the coil before escaping through the flue outlet; and a burner cone in the axial opening at the bottom of the air induction head formed with vanes for swirling the air introduced by way of the spiral passage in said head.

2. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through the axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening at the bottom of the air induction head formed with vanes for swirling the air introduced by way of the spiralized passage in said head; means for connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; and a hot water delivery conduit connected to the bottom end of the coil and terminating in a manually operable spray nozzle.

3. In a water heating apparatus, a heater comprising an upright casing having a continuous outer wall with a helical passage therein, said casing being closed at the bottom; a hollow air induction head at the top of the casing, said head being formed in a horizontal plane with a spiral passage leading to the axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through an axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening in the bottom of the air induction head formed with vanes for swirling the air introduced by way of the spiralized passage in said head; means for connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; a hot water delivery conduit connected to the bottom end of the coil and terminating in a manually operable spray nozzle; and a valve in the hot water delivery conduit adapted to open automatically in the event that the pressure in the coil exceeds a prescribed limit while the spray nozzle is closed.

4. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through an axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening at the bottom of the air induction head formed with vanes for swirling the air introduced by way of the spiralized passage in said head; means for connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; a hot water delivery conduit connected to the bottom end of the coil and terminating in a manually operable spray nozzle; a reservoir for a chemical solution; and a pipe with a regulatable valve therein leading from said reservoir and connecting into the hot water delivery conduit.

5. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through the axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening at the bottom of the air induction head formed with vanes for swirling the air introduced by way of the spiral passage in said head; means connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; a hot water delivery conduit connected to the bottom end of the coil and terminating in a manually operable spray nozzle; a reservoir for liquid fuel; and a pipe with a pump interposed therein, extending from the fuel reservoir to the burner nozzle within the casing.

6. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through an axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening at the bottom of the air induction head formed with vanes for swirling the air introduced by way of the spiral passage in said head; means connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; a hot water delivery conduit connected to the bottom end of the coil and terminating in a manually operable spray nozzle; a reservoir for liquid fuel; a pipe with a pump interposed therein, extending from the fuel reservoir to the burner nozzle within the casing; and a drive motor common to the water and fuel pumps.

7. In water heating apparatus, a heater comprising an upright casing having a continuous outer wall with a helical passage therein, said casing being closed at the bottom; a hollow air induction head at the top of the casing, said head being formed in a horizontal plane with a spiral passage leading to an axial opening in the bottom of the head; a blower connected to the entrant end of the spiral passage; a hollow baffle extending axially down within the casing from the air induction head with provision of a surrounding interval between it and the casing wall, said baffle terminating short of the casing bottom; a pipe coil disposed, with clearance all around, in the interval between the casing wall and the baffle; an upward flue outlet in the air induction head in communication with said interval at the top; means for causing water to be heated to traverse the helical passage in the casing wall in one direction and to traverse the coil in the opposite direction; a burner nozzle for directing its flame downwardly through the axial opening in the bottom of the air induction head into the baffle, whereby hot gases of combustion are constrained to pass about the bottom of said baffle and then upwardly through the aforesaid interval between and about the convolutions of the coil before escaping through the flue outlet; a burner cone in the axial opening at the bottom of the air induction head formed with vanes for swirling the air introduced by way of the spiral passage in said head; means connecting the bottom end of the helical passage in the casing wall to a source of water under pressure; a water tank; a pipe connected to the upper end of the coil, said pipe terminating in the tank and having a pump interposed therein; another pipe connected to the upper end of the helical passage in the casing wall to the water tank and terminating in a valve automatically operable by a float in the tank; a hot water delivery conduit connected to the bottom end of the coil and terminating in a manually operable spray nozzle; a reservoir for liquid fuel; a pipe with a pump interposed therein, extending from the fuel reservoir to the burner nozzle within the casing; a drive motor common to the water and fuel pumps; and means operative automatically to stop the blower motor and the water pump and oil pump motor when the water in the tank recedes to a prescribed low level.

8. According to claim 1, wherein the wall of the casing has a plain cylindrical outer shell and a corrugated lining which, in conjunction with said shell, forms the helical passage in said wall.

References Cited in the file of this patent
UNITED STATES PATENTS

| | | |
|---|---|---|
| 2,160,644 | Clarkson | May 30, 1939 |
| 2,295,228 | Malsbary | Sept. 8, 1942 |
| 2,350,876 | Clarkson | June 6, 1944 |
| 2,621,635 | Joosten | Dec. 16, 1952 |